Sept. 11, 1928.  W. J. CHIEVITZ  1,683,593
BEARING
Filed Sept. 12, 1927

INVENTOR:
William J. Chievitz
HIS ATTORNEYS

Patented Sept. 11, 1928.

1,683,593

UNITED STATES PATENT OFFICE.

WILLIAM J. CHIEVITZ, OF CANTON, OHIO, ASSIGNOR TO THE TIMKEN ROLLER BEARING COMPANY, OF CANTON, OHIO, A CORPORATION OF OHIO.

BEARING.

Application filed September 12, 1927. Serial No. 218,925.

This invention relates to the mounting of shafts. One of its principal objects is to enable a shaft to be adjusted endwise by the bodily movement thereof. Another principal object is to provide for the use of two or more series of anti-friction bearings in such manner that the raceway members thereof may be adjusted relative to each other without disturbing the endwise adjustment of the shaft. Another principal object is to enable the shaft to be adjusted bodily endwise without disturbing the adjustment of the bearings and vice versa to enable the bearings to be adjusted without disturbing the endwise adjustment of the shaft. Another object is to provide for the locking of the parts in adjusted position.

The invention consists in the arrangements and combinations of parts hereinafter described and claimed.

Figure 1:
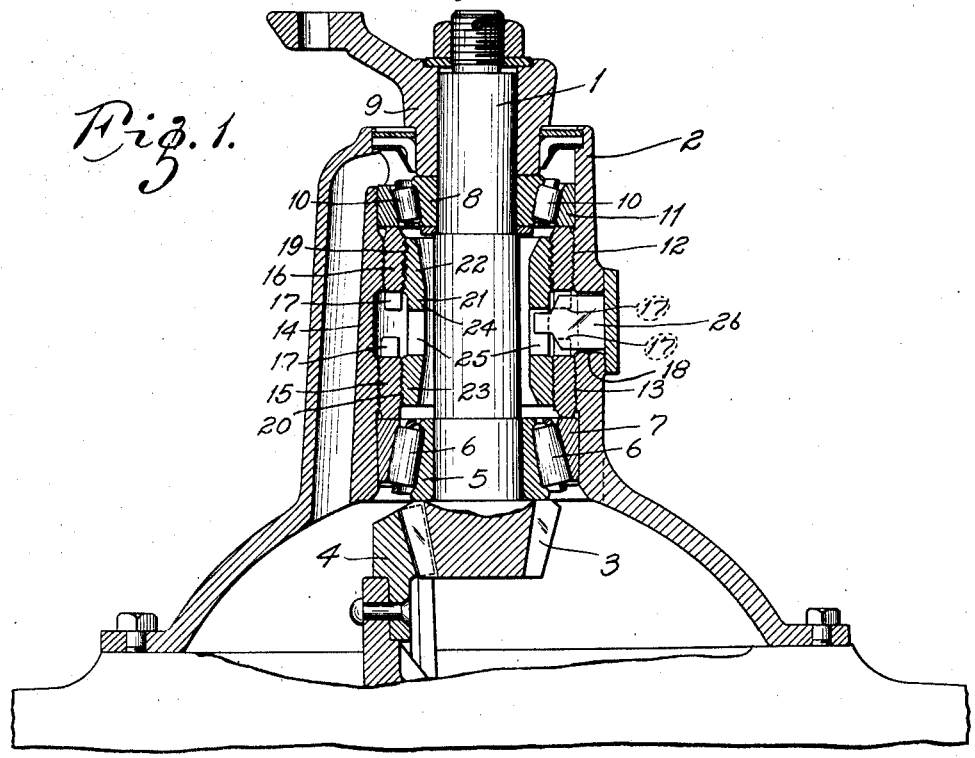
Figure 2:
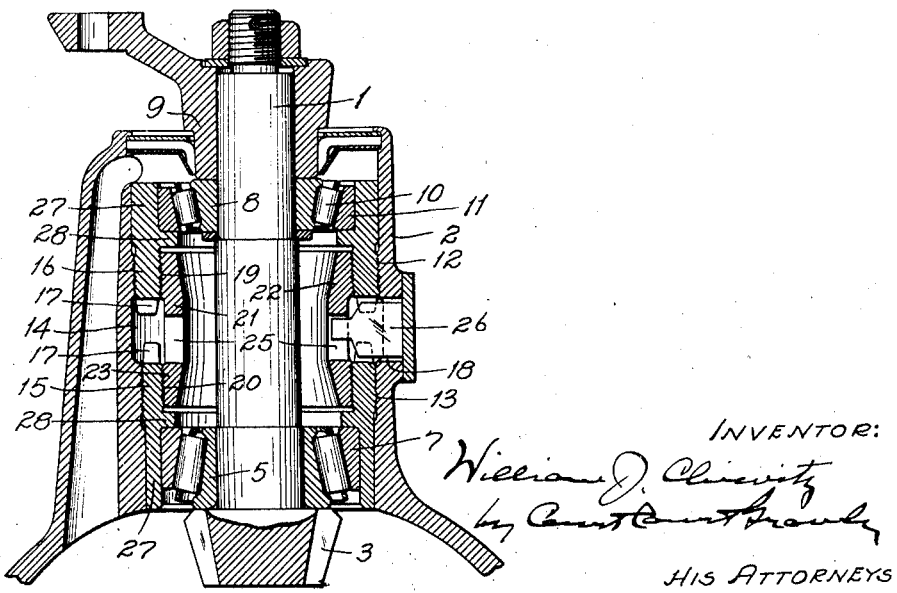

In the accompanying drawing wherein like reference numerals refer to like parts wherever they occur, Fig. 1 is a longitudinal sectional view of a pinion shaft mounted in accordance with my invention, and Fig. 2 is a similar view illustrating a modification of construction.

Fig. 1 illustrates a propeller shaft 1 of a motor vehicle mounted in a housing 2, which is part of the axle housing or of a differential carrier of well known type. At one end of the shaft, is a bevel pinion 3, which is fixed thereon integral therewith and is shown as meshing with the bevel ring gear 4 of a differential mechanism. Mounted on the shaft and with large end abutting against the back of the pinion is a cone or inner bearing member 5 of an antifriction bearing. Surrounding this cone is a series of taper rollers 6 that run in a conical cup or outer bearing member 7 which has a sliding fit in the inner cylindrical end of the housing. The outer end portion of the shaft is provided with a cone or inner bearing member 8 whose large end bears against a suitable abutment member 9 secured to said shaft. Surrounding this cone is a series of taper rollers 10 that cooperate with a cup or outer bearing member 11 that has a sliding fit in the outer cylindrical end portion of the housing.

The inner cylindrical wall of said housing has two screw threads 12, 13 formed therein, which are of the same pitch and are spaced apart by an annular channel or groove 14 in the middle portion of the housing. On these threads respectively work threaded rings 15, 16 whose adjacent or inner ends are provided with series of lugs 17 that extend into the space between said rings and opposite said annular groove or channel. Also opposite such groove, an opening 18 is formed through the wall of the housing of sufficient size to permit the insertion and limited circumferential movement of a tool adapted to engage the adjacent lugs and turn the same to a limited extent. Each of such threaded rings 15, 16 is capable of being turned independently of the other so as to move it endwise of the housing.

The inner surface of each of the rings 15, 16 is screw-threaded; but the pitch of the inner screw thread 19 of one ring is different from the pitch of the inner screw thread 20 of the other ring. As illustrated, the pitch of the inner thread of the inner ring is the same as that of the outer threads of both rings, say, for instance 16 pitch; whereas the inner thread of the outer ring may be either higher or lower, say for instance, 14 pitch. Inside of said rings is a sleeve 21 with its end portions 22, 23 screw-threaded to work on the inner threads of the two rings respectively. The middle portion 24 of this sleeve is of smaller diameter than the threaded portions and has a series of longitudinal slots 25 cut therethrough, which slots are opposite the groove 14 in the wall of the housing and therefore in position to be reached by a suitable instrument inserted through the opening in the wall of the housing.

By the arrangement described, the two threaded rings 15, 16 and the locking sleeve 21 may be turned as a unit by means of a tool that passes through the hole in the housing and engages all three pieces at the same time, in which case the three parts move endwise in the same direction. Ordinarily this would be the first movement in the course of adjusting the enmeshment of the pinion with the gear ring of the differential mechanism. On the other hand, by using a tool that engages only the locking sleeve and the ring 16 whose inner thread is of different pitch from the pitch of its outer thread, it is practicable to turn these two parts endwise, while the other ring 15 is held stationary. Ordinarily this is the movement by which the adjustment of the outer bearing would be effected. After the inner and outer bearings are thus adjusted, the locking sleeve 21 alone is turned by means of a tool inserted through said hole in the housing, while the two threaded rings 15, 16 remain stationary. By reason of the difference of pitch in the threads by which the sleeve engages the respective threaded rings, the effect of this turning of the sleeve is to tighten and lock the two rings and consequently the bearings in adjusted position. After the parts have been adjusted, they are kept from turning by a suitable locking key 26 that extends through the hole in the housing and has one portion that engages a slot in the locking sleeve and other portions that engage between lugs on the ends of the adjusting nuts, all at the same time. Any suitable device may be used for holding this locking key in place.

It is noted as an important advantage of this construction that the locking of the adjusting members is effected without any circumferential stress on the bearing members that would tend to impair the true circularity thereof. Another important advantage is that, by reason of the differential action due to the sleeves of the locking sleeve being of different pitch, it is not necessary that any of the threads should be cut with the same degree of precision that would otherwise be necessary. It is further noted that the parts are all easy to manufacture and easy to adjust and are adequately protected from dirt and injury.

In the construction illustrated in Fig. 1, the bearing cups are arranged to have a sliding fit in the housing, and the threaded rings abut against the ends of said cups. In the modification illustrated in Fig. 2, the bearing cups fit in seats provided therefor in the threaded rings, and said rings are extended beyond their threaded portions for this purpose. The outer cylindrical surface of such extension 27 fits freely in the housing, and the inner surface of the ring has an annular rib 28, which serves as an abutment for the end of the cup. By this arrangement, the cup participates directly in all the movements of the ring.

In the construction illustrated in Fig. 1, the diameters of the two threaded sections of the housing are of the same diameter, which diameter is less than the diameter of the end portions in which the bearing cups fit. Accordingly each bearing must be assembled in the housing separately. In the construction illustrated in Fig. 2, the internal diameter of the housing is least at its innermost end and greatest at its outermost end, and its inner threaded portion is of less diameter than its outer threaded portion. By this arrangement, the inner adjusting ring, which also serves as the seat for the bearing cup, can be inserted through the outer end of the housing. This enables the shaft and its bearings to be mounted in the housing as a unit and be removed therefrom as a unit; and it enables the bearings to be adjusted on the work bench and the assembly to be mounted in the housing without disturbing the adjustment of such bearings. Such assembly can be made by temporarily locking the adjusting rings together and screwing them into the threads provided therefor in the housing.

Obviously the construction hereinbefore described admits of modification without departing from my invention. For instance, balls can be substituted for taper rollers without sacrificing any of the advantages of the construction. Likewise, cylindrical rollers may be used to advantage in the construction illustrated in Fig. 2. Accordingly I do not wish to limit myself to details of construction described.

What I claim is:

1. The combination with a shaft having a pinion at one end thereof and a housing for said shaft, of roller bearings interposed between them and means for adjusting said bearings, said means comprising rings having exterior threads of equal pitch engaging the threaded inner surface of the housing and a locking sleeve with threads of different pitch engaging the threaded inner surfaces of said rings.

2. The combination with a shaft, a housing therefor, and roller bearings interposed between them, of an adjusting device comprising rings adapted to abut endwise against the outer bearing members of said bearings and having exterior threads of equal pitch engaging the threaded inner surface of the housing, and a locking sleeve with threads engaging the threaded inner surfaces of said rings, one of the threads of said sleeve being of the same pitch as the exterior threads of said rings and the other thread of said sleeve being of a different pitch.

3. The combination of a shaft, a housing therefor, anti-friction bearings interposed between them and consisting of inner and outer raceway members and rollers between them, adjusting rings having threaded engagement with the inner wall of said housing and operatively connected to said outer bearing members to move the same endwise, and a locking sleeve having threaded engagement with the inner surfaces of said adjusting rings, the outer threads of both rings and the inner thread of one ring being of the same pitch and the inner thread of the other ring being of a different pitch.

4. The combination of a shaft, a housing therefor, and anti-friction bearings interposed between them and consisting of inner and outer raceway members and rollers between them, adjusting rings having threaded engagement with the inner wall of said housing and operatively connected to said outer bearing members to move the same, and a locking sleeve having threaded engagement with the inner surfaces of said adjusting rings, the outer threads of both rings and the inner thread of one ring being of the same pitch and the inner thread of the other ring being of a different pitch, said housing having a hole through its wall and the rings and sleeve being adapted to be turned by a tool inserted through said hole.

Signed at Canton, Ohio, this 6" day of September, 1927.

WILLIAM J. CHIEVITZ.